United States Patent
Campbell et al.

(10) Patent No.: US 9,944,230 B2
(45) Date of Patent: Apr. 17, 2018

(54) COMPOSITE RUNNING BOARD

(71) Applicant: Tiercon Corp., Toronto (CA)

(72) Inventors: Christopher Campbell, Vineland (CA);
Mihai Cioranic, Cambridge (CA);
Bradley Newberry, Huntsville (CA);
Michael Weber, Rochester Hills, MI (US)

(73) Assignee: Tiercon Corp, Toronto, Ontario (CA)

( * ) Notice: Subject to any disclaimer, the term of this patent is extended or adjusted under 35 U.S.C. 154(b) by 0 days.

(21) Appl. No.: 15/303,263

(22) PCT Filed: Apr. 15, 2015

(86) PCT No.: PCT/US2015/025918
§ 371 (c)(1),
(2) Date: Oct. 11, 2016

(87) PCT Pub. No.: WO2015/160917
PCT Pub. Date: Oct. 22, 2015

(65) Prior Publication Data
US 2017/0036604 A1    Feb. 9, 2017

Related U.S. Application Data

(60) Provisional application No. 61/979,681, filed on Apr. 15, 2014.

(51) Int. Cl.
*B60R 3/00*    (2006.01)
(52) U.S. Cl.
CPC ......... *B60R 3/002* (2013.01); *B60Y 2304/076* (2013.01); *B60Y 2410/122* (2013.01)

(58) Field of Classification Search
CPC .. B60R 3/00; B60R 3/002; B60R 9/02; B60Y 2410/122
See application file for complete search history.

(56) References Cited

U.S. PATENT DOCUMENTS

| 2,070,839 | A  |   | 2/1937  | Place |
| 5,769,439 | A  | * | 6/1998  | Thompson ............. B60R 3/002 280/163 |
| D400,149  | S  | * | 10/1998 | Zentner ........................ D12/203 |
| 6,513,821 | B1 | * | 2/2003  | Heil ........................ B60R 3/002 182/228.2 |

(Continued)

FOREIGN PATENT DOCUMENTS

CA    2123621    11/1995

OTHER PUBLICATIONS

European Search Report dated Jan. 2, 2017, for European Application No. EP 15779469. Date of completion Dec. 19, 2016.

*Primary Examiner* — Brian L Swenson
(74) *Attorney, Agent, or Firm* — Miller Canfield

(57) ABSTRACT

A composite running board for use with an automotive vehicle. The running board includes a step portion formed by a top deck and an aerodynamic bottom cover. A mounting portion is formed integrally with the step portion and includes a vertical mounting plate and a horizontal mounting plate for attaching the running board to the vehicle. A plurality of support ribs are sandwiched between the top deck and the bottom cover and connected to the mounting portion to provide structural rigidity to the running board.

10 Claims, 9 Drawing Sheets

(56) References Cited

U.S. PATENT DOCUMENTS

| | | | |
|---|---|---|---|
| 6,997,469 B2* | 2/2006 | Lanoue | B60R 3/002 280/163 |
| 7,513,518 B1 | 4/2009 | Mayville et al. | |
| 7,621,546 B2* | 11/2009 | Ross | B60R 3/002 280/163 |
| 9,346,404 B1* | 5/2016 | Bundy | B60R 3/002 |
| 2002/0158439 A1* | 10/2002 | Benirschke | B60R 3/002 280/163 |
| 2003/0184039 A1 | 10/2003 | Schumacher | |
| 2004/0239068 A1* | 12/2004 | Chuba | B60R 3/002 280/163 |
| 2005/0012295 A1 | 1/2005 | Chevalier et al. | |
| 2007/0138757 A1 | 6/2007 | Kuntze | |
| 2007/0296175 A1 | 12/2007 | Flajnik et al. | |
| 2008/0271936 A1* | 11/2008 | Kuntze | B60R 3/002 180/90.6 |
| 2009/0121449 A1* | 5/2009 | Kuntze | B60R 3/00 280/163 |
| 2012/0091682 A1* | 4/2012 | Kowalski | B60R 3/002 280/163 |
| 2013/0323454 A1* | 12/2013 | Chapman | B60R 3/002 428/74 |

* cited by examiner

COMPOSITE RUNNING BOARD

CROSS-REFERENCE TO RELATED APPLICATION

This application claims priority to and all the benefits of U.S. Provisional Application No. 61/979,681, filed on Apr. 15, 2014 and entitled "Composite Running Board".

BACKGROUND OF THE INVENTION

1. Field of the Invention

The present invention relates to a running board for an automotive vehicle. More particularly, the present invention relates to a composite running board formed by step portion integrally molded with a mounting portion and plurality of support ribs to provide structural rigidity and design flexibility to the running board.

2. Description of Related Art

Automotive vehicles typically include running boards extending longitudinally along the lateral sides of the vehicle to assist with ingress and egress within the vehicle and to provide for design aesthetics to the vehicle. Running boards commonly include a step or deck portion manufactured from rolled formed steel or extruded aluminum and include a plurality of stamped metal mounting brackets attached between the step portion and the lateral side body panel of the vehicle for securing the running board to the vehicle. It has also recently become common for running boards to include a one piece plastic molded step or deck portion to provide a more cost effective and reduced weight alternative to the steel step portion. However, the plastic molded step portion is still typically mounted to the vehicle via a plurality of stamped metal mounting brackets.

It remains desirable to provide a composite running board formed by a step portion integrally molded with a composite mounting portion and plurality of composite support ribs to provide a structural rigid and aesthetic running board to the vehicle.

SUMMARY OF THE INVENTION

According to one aspect of the invention, there is provided a composite running board for use with an automotive vehicle. The running board includes a step portion formed by a top deck and an aerodynamic bottom cover. A mounting portion is formed integrally with the step portion and includes a vertical mounting plate and a horizontal mounting plate for attaching the running board to the vehicle. A plurality of support ribs are sandwiched between the top deck and the bottom cover and connected to the mounting portion to provide structural rigidity to the running board.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
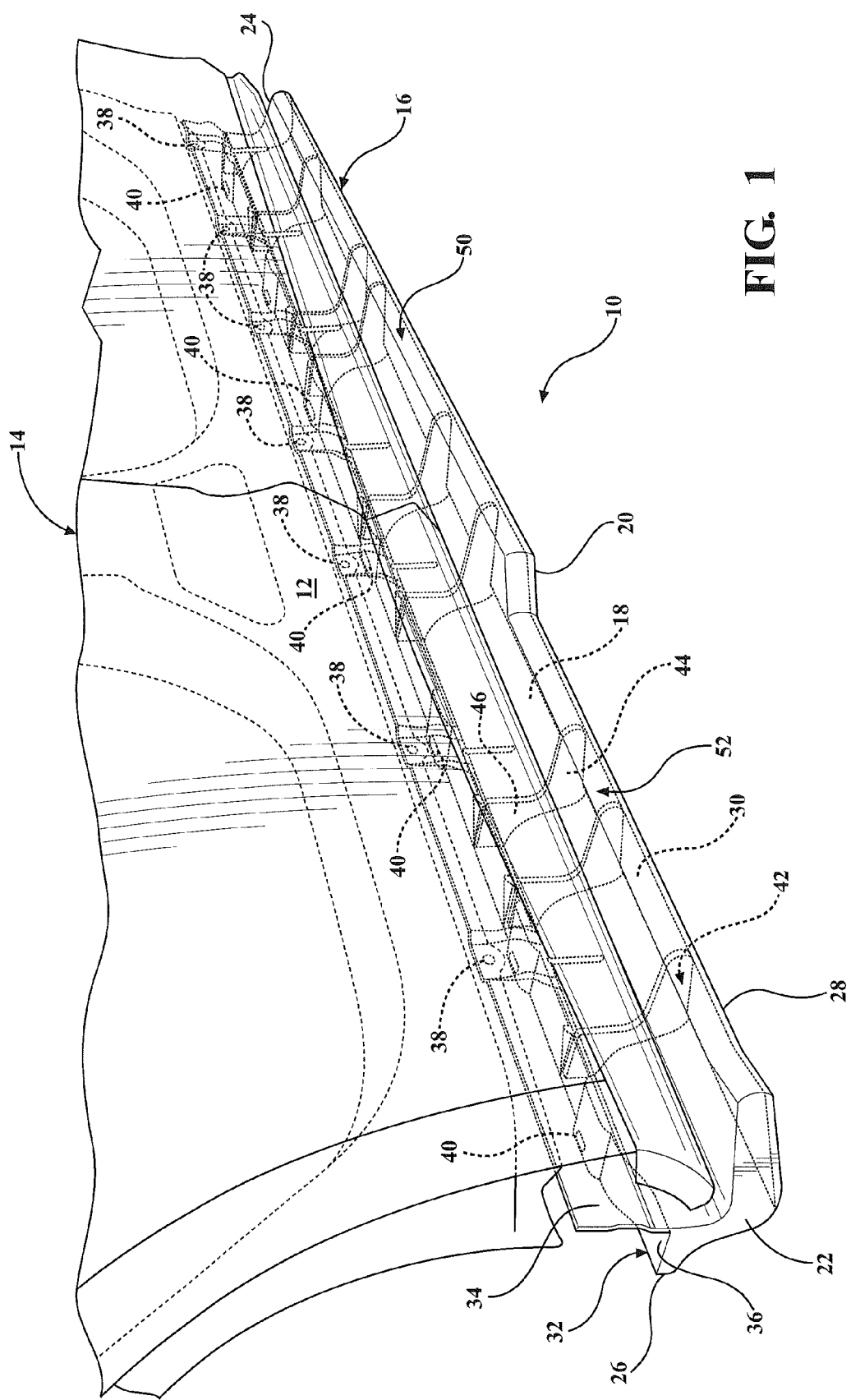
FIG. 1 is a fragmentary perspective view of a composite running board attached to an automotive vehicle according to one embodiment of the invention.
Figure 2:
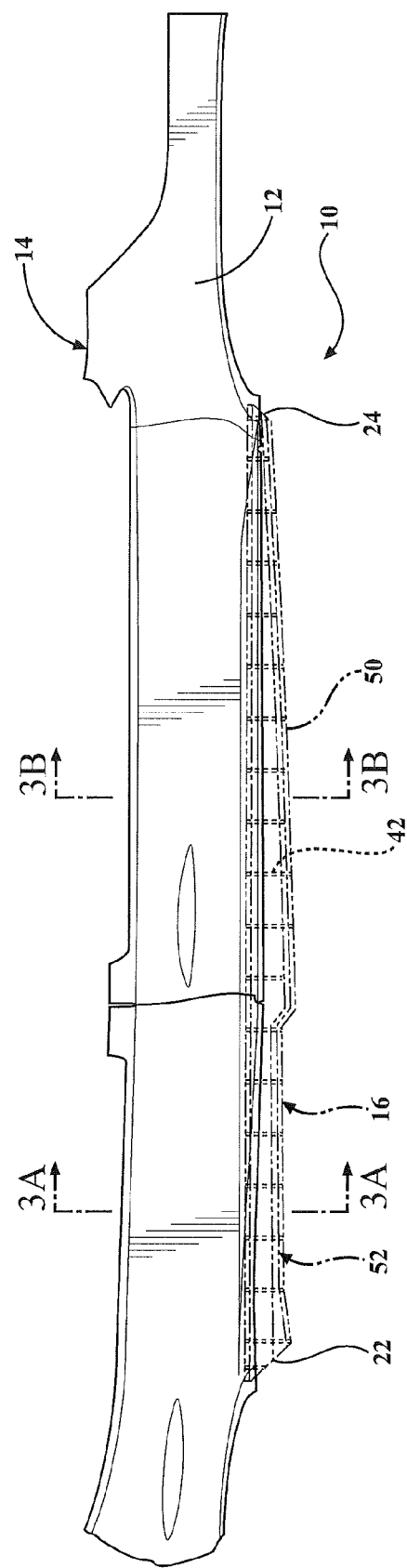
FIG. 2 is a fragmentary side view of the composite running board and vehicle.
Figure 3:
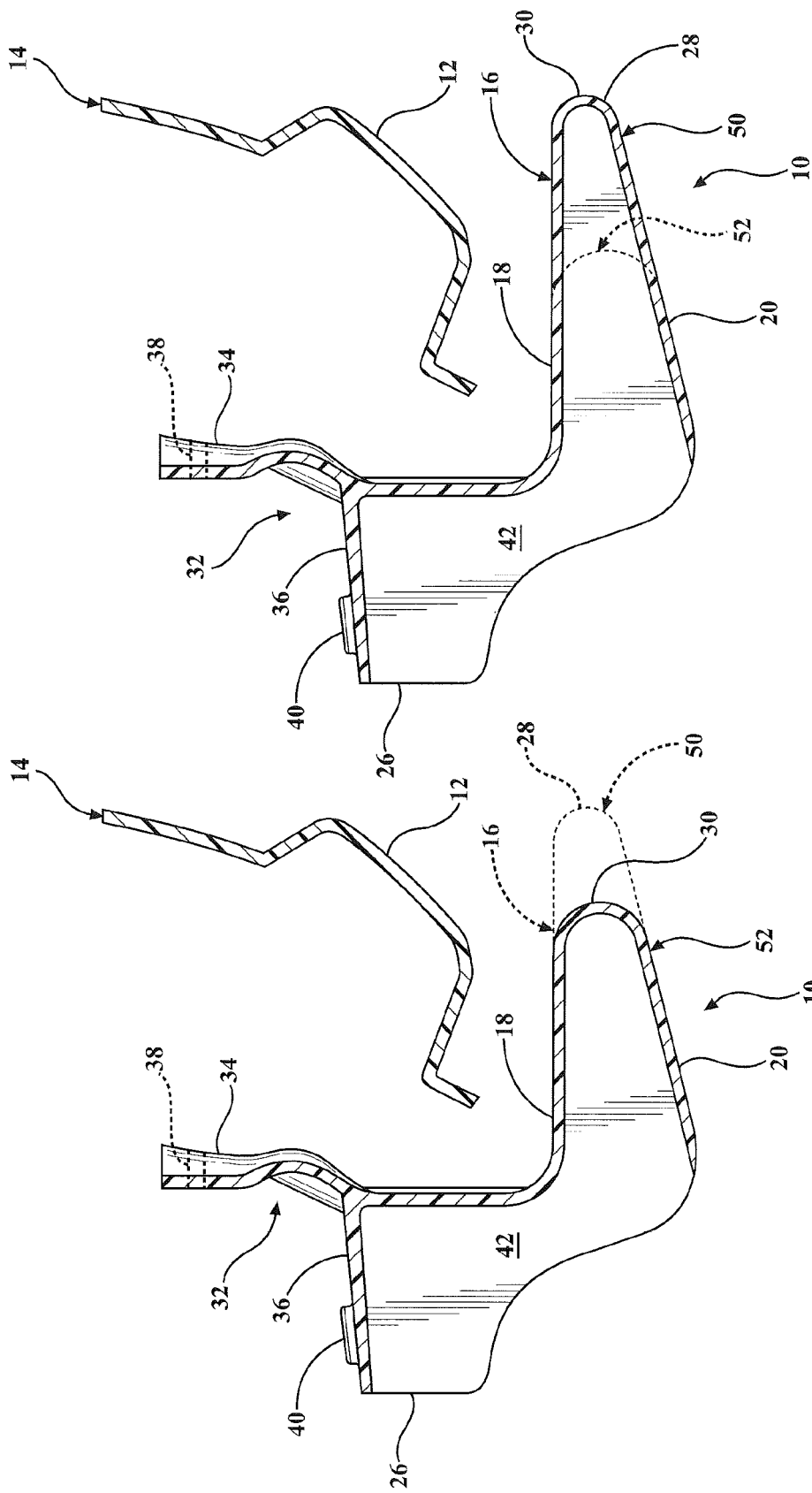
FIG. 3a is a cross-sectional view taken along line 3a-3a of FIG. 2.
FIG. 3b is a cross-sectional view taken along line 3b-3b of FIG. 2.
Figure 4:
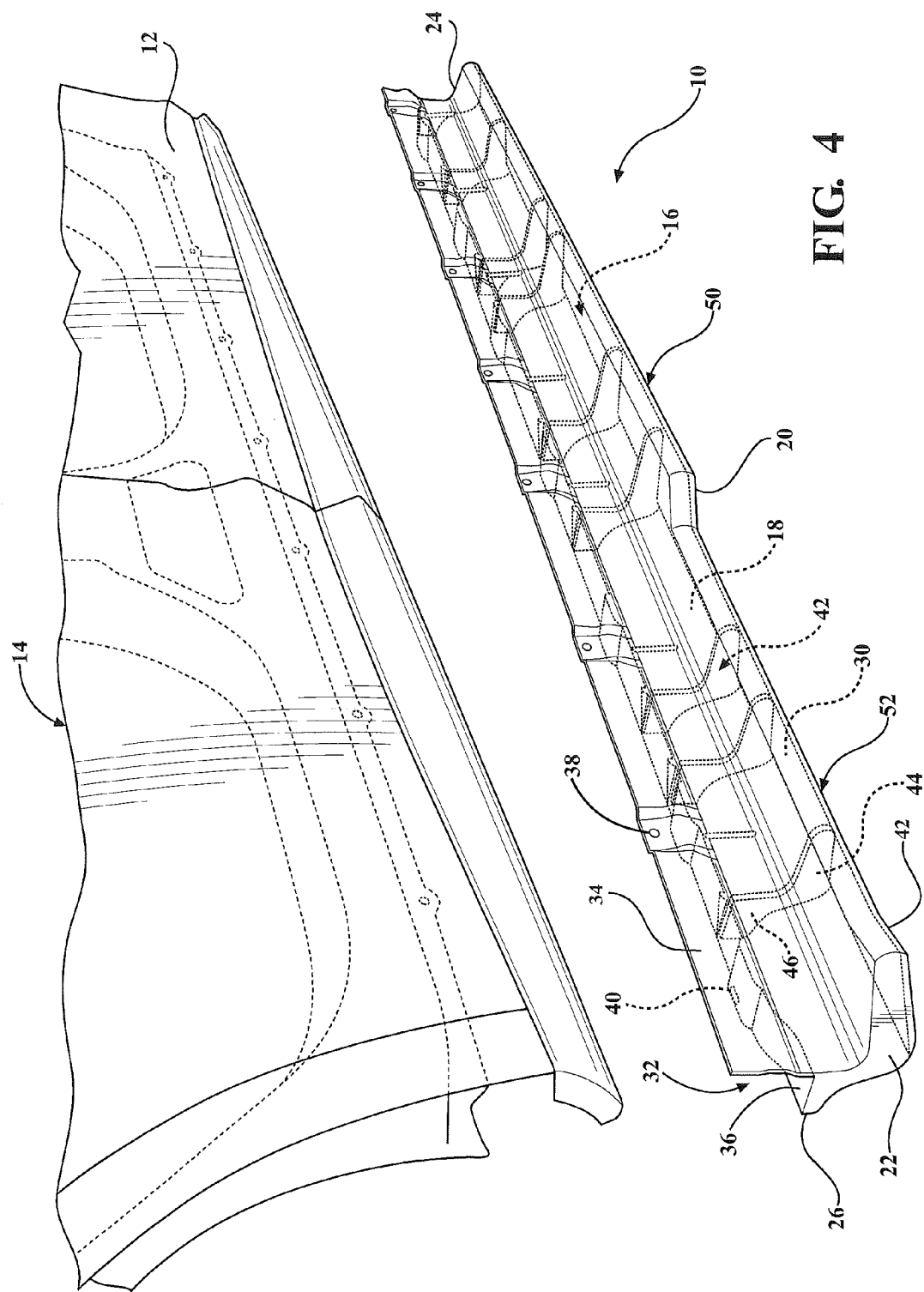
FIG. 4 is a fragmentary exploded perspective view of the composite running body aligned for attachment with the vehicle.
Figure 5:
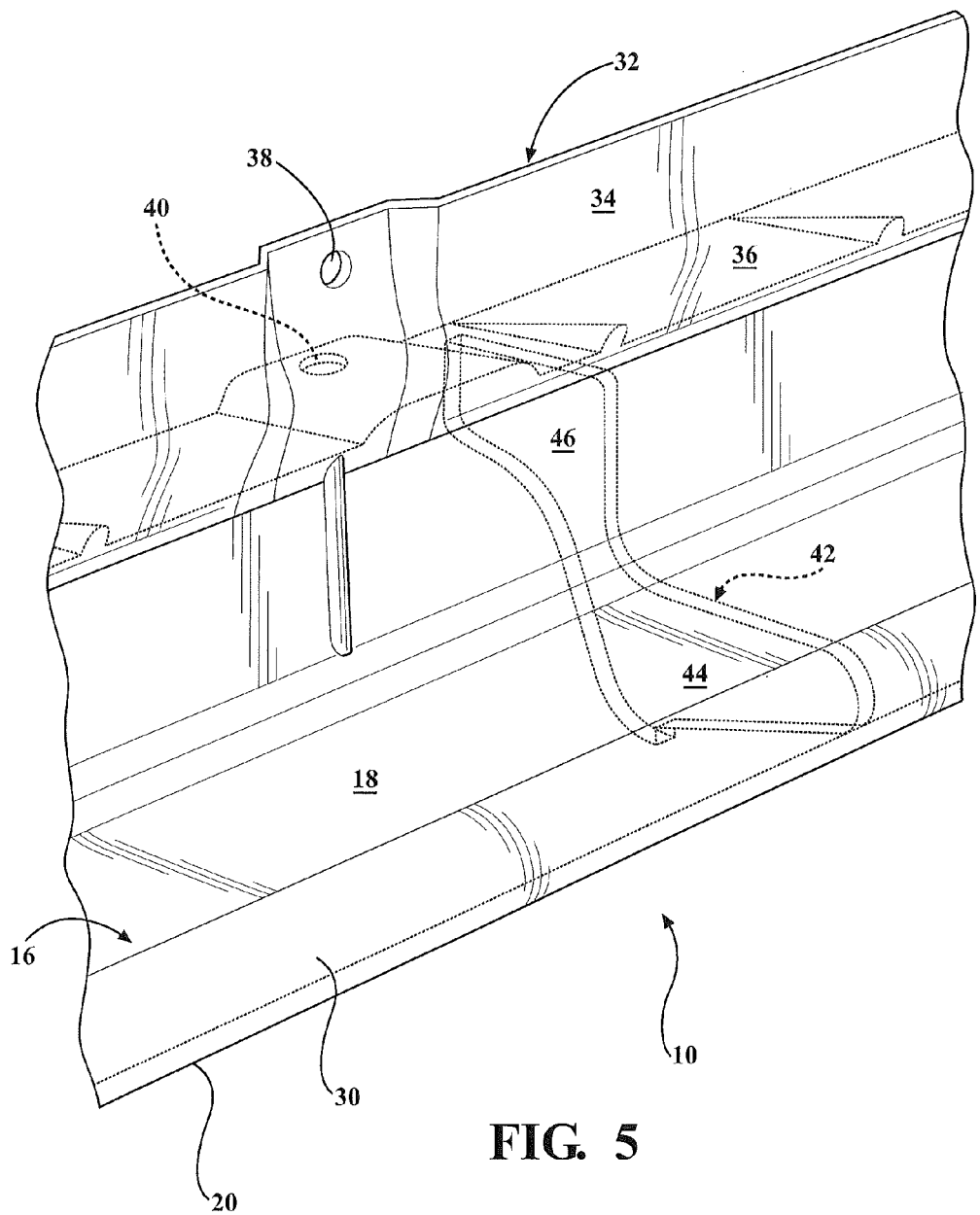
FIG. 5 is an enlarged view of a mounting portion and support rib of the composite running board.

Referring to the Figures, wherein like numerals indicate like or corresponding parts throughout the several views, a composite running board for use on an automotive vehicle is generally shown at 10. The composite running board 10 is an integrally molded plastic composite assembly adapted to be fixedly mounted to the longitudinal side body panel or cladding 12 of an automotive vehicle 14.

Referring to FIGS. 1-5, the composite running board 10 includes a step portion 16 defined by a generally flat horizontal top deck plate 18 and a generally flat horizontal bottom cover plate 20 spaced generally parallel from and below the top deck plate 18. The top and bottom plates 18, 20 extend longitudinally between opposite first and second ends 22, 24 and laterally between an inboard side 26 and outboard side 28. The outboard sides 28 of the top and bottom plates 18, 20 are joined by a distal edge cap 30. It should be appreciated that the shape, contour and dimensions of the step portion 16 of the running board 10 may vary along both its longitudinal length, width between inboard and outboard sides 26, 28, and thickness in the vertical or z-axis to accommodate various shapes and contours of the vehicle side body panel or cladding 12, as well as provide a variety of aesthetic design features and flexibility, and aerodynamic variations.

The composite running board 10 further includes a mounting portion 32 formed integrally with the step portion 16 and extending from the inboard side 26 of the step portion 16. The mounting portion 32 is defined by a generally vertical face mounting wall 34 and a generally horizontal top mounting wall 36 both of which are adapted to mount and fixedly secure the running board 10 to the vehicle side body panel 12. The vertical face mounting wall 34 includes a plurality of spaced apart apertures 38 extending therethrough for receiving fasteners for mounting the running board 10 to the lateral side of the vehicle side body panel 12. Similarly, the horizontal top mounting wall 36 includes a plurality of spaced apart apertures 40 extending therethrough for receiving fasteners for mounting the running board to the underside of the vehicle side body panel 12.

Finally, the composite running board 10 also includes a plurality of integrally molded support ribs 42 spaced apart along the longitudinal length of the running board 10 between the first and second ends 22, 24 of the step portion 16. Each of the support ribs 42 includes a first portion 44 sandwiched and extending between the top deck plate 18 and the bottom cover plate 20 to provide structural rigidity to the step portion 16. Each support rib 42 also includes a second portion 46 extending between the first portion 44 and the top mounting wall, as best shown in FIGS. 3a and 3b, for providing structural rigidity, strength, and support to the mounting portion 32.

The composite running board 10 of FIGS. 1-5 includes a lateral step configuration along its longitudinal length, as best shown in FIG. 1. More specifically, a first section 50 of the step portion 16 may extend laterally outboard farther from the side body panel 12 of the vehicle 14 than a second section 52 of the step portion 16. This variation in the lateral step configuration may be to accommodate different vehicle side body panel design, front and rear door configurations, or other aesthetics.

Figure 6:
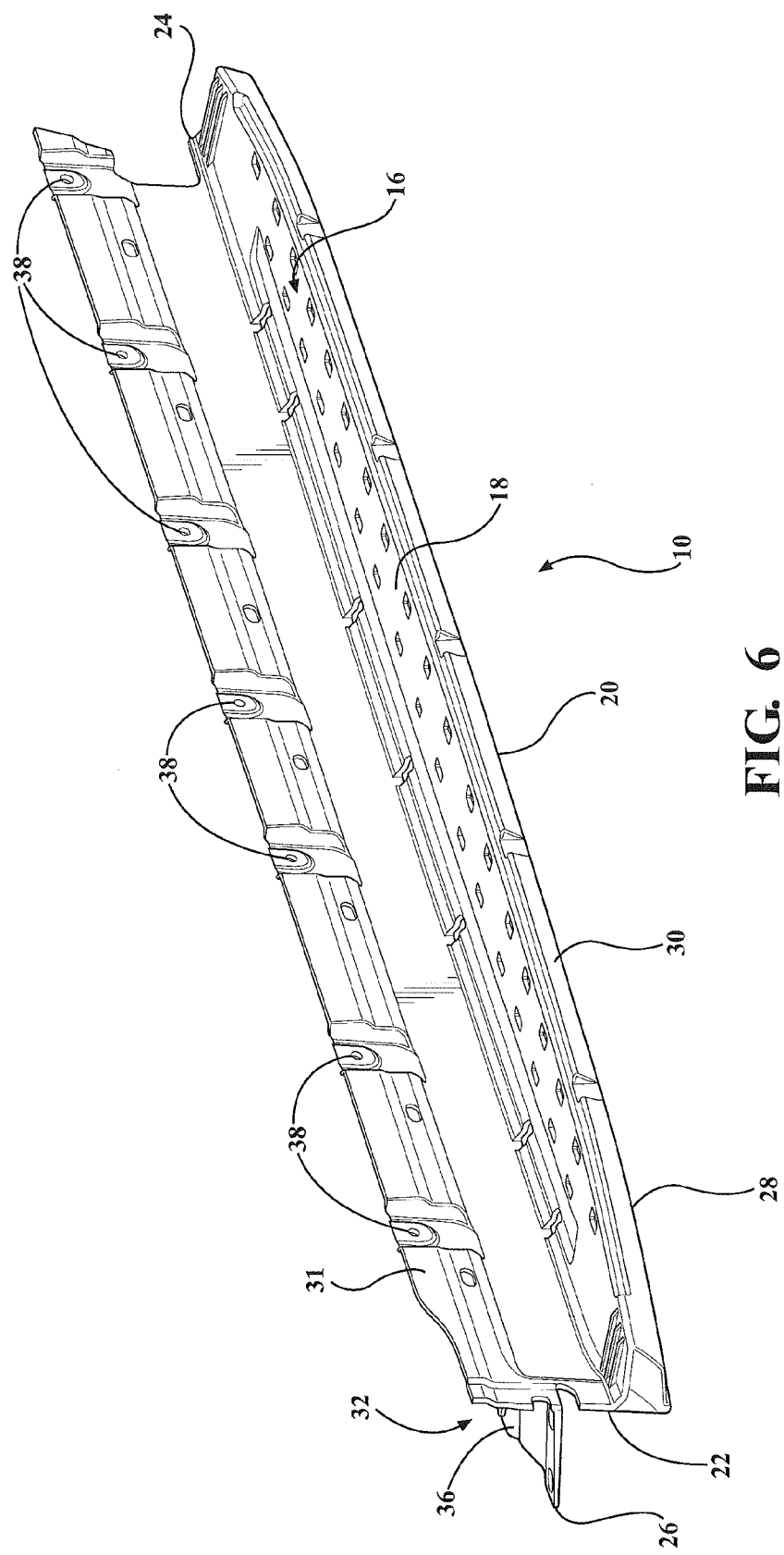
FIG. 6 is a front perspective view of a composite running board having an alternative aesthetic design.
Figure 7:
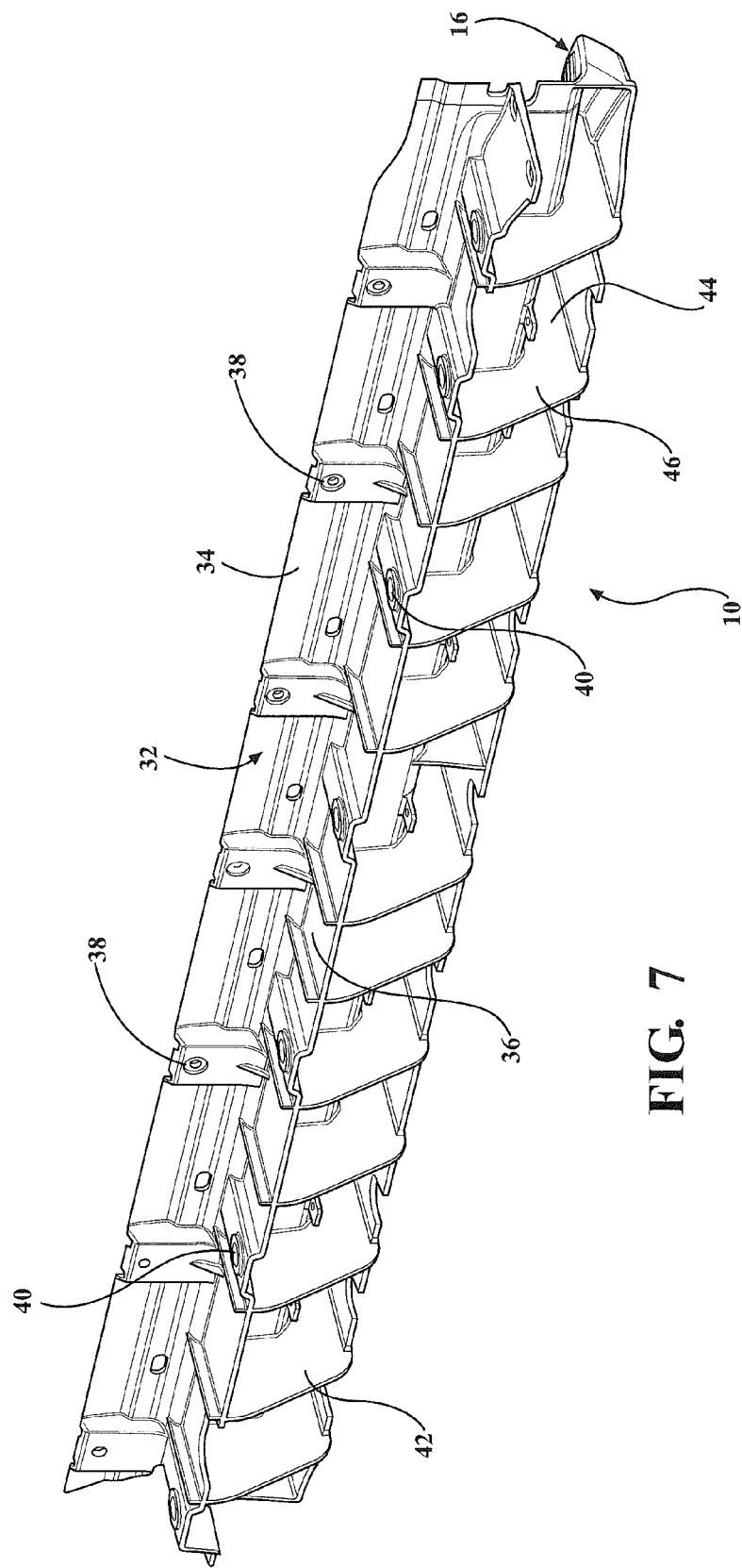
FIG. 7 is a rear perspective view of the composite running board of FIG. 6.
Figure 8:
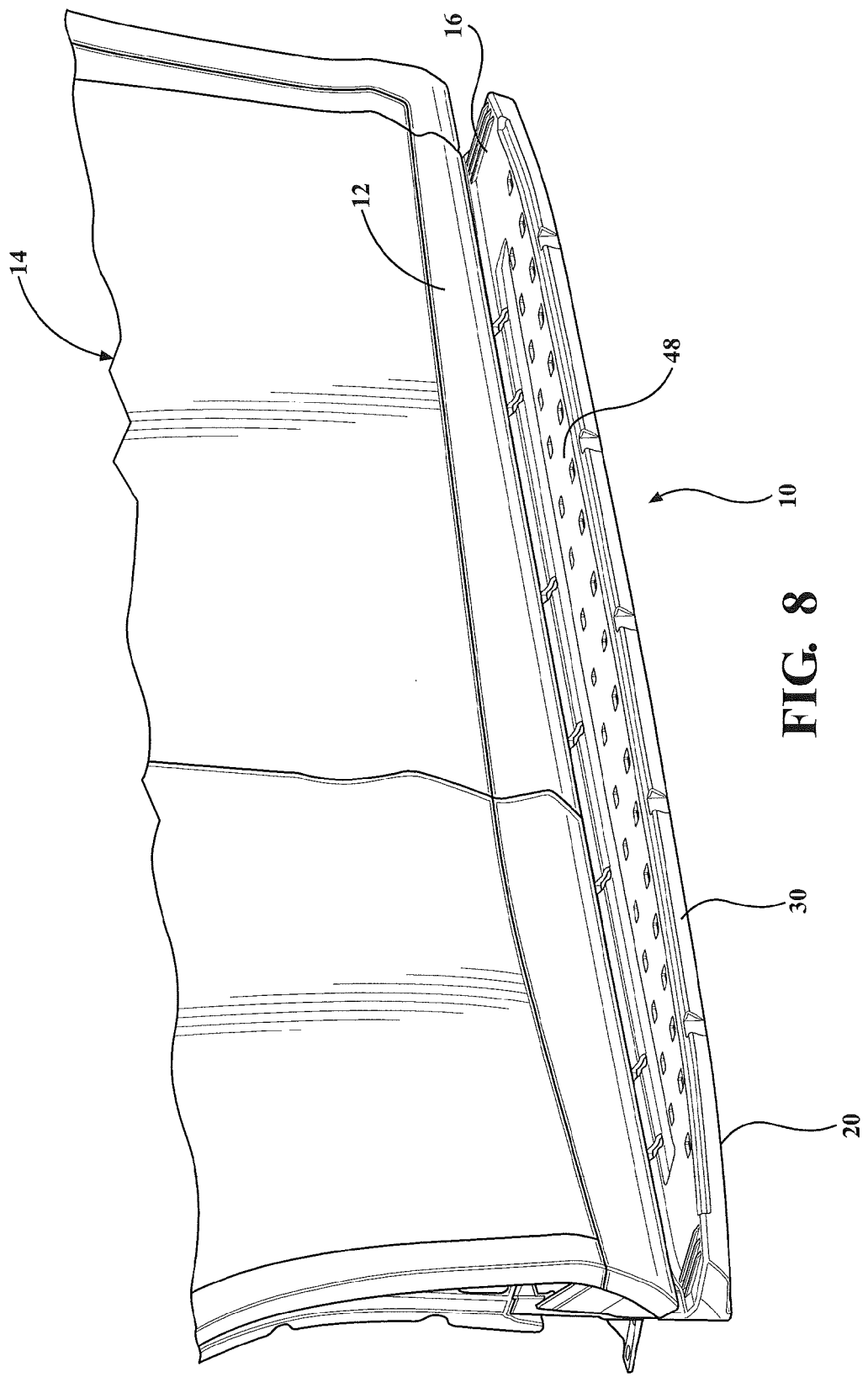
FIG. 8 is a front perspective view of the composite running board of FIG. 6 attached to the vehicle.

Referring to FIGS. 6-8, a composite running board 10 is shown wherein the step portion 16 is generally curved along its longitudinal length without the lateral step configuration. A stepping mat or insert 48 may be positioned on the top deck plate 18 to aid in traction or vary the appearance of the running board 10 as desired.

Figure 9:
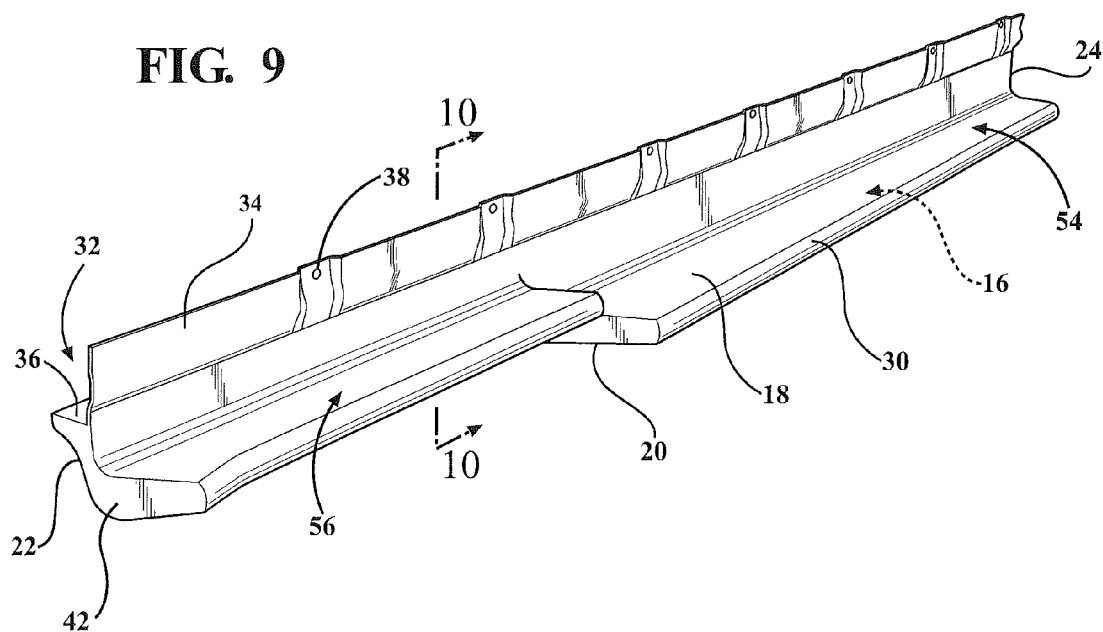
FIG. 9 is a front perspective view of a composite running board having yet another alternative aesthetic and functional design.
Figure 10:
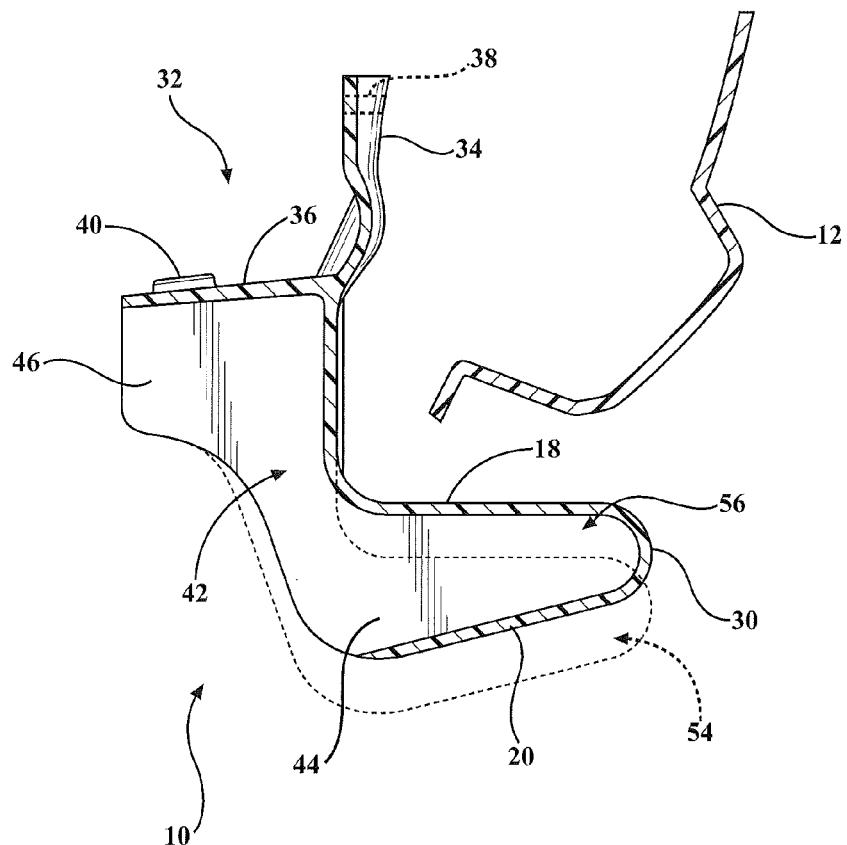
FIG. 10 is cross-sectional view taken along line 10-10.

Finally, referring to FIGS. 9 and 10, a composite running board 10 is shown wherein the step portion 16 includes a vertical change in step configuration. More specifically, a first section 54 of the step portion 16 may extend vertically lower or below a second section 56 of the step portion 16. This variation in the vertical step configuration may be to accommodate varying door entrance heights between the front and rear vehicle doors as is common in SUV type vehicles. FIG. 10 illustrates that the construction of the composite running board 10 is the same as that of FIGS. 1-5 wherein each section 54, 56 includes a top deck plate 18, a bottom cover plate 20 and a mounting portion 32. The mounting portion 32 includes a vertical face mounting wall 34 and a horizontal top mounting wall 36 for mounting the running board to the side body panel 12 of the vehicle. Finally, each section includes a plurality of spaced apart support ribs 42 sandwiched between the top deck plate 18 and bottom cover plate 20 for providing structural rigidity and strength to the step portion 16.

The integrally combined step portion 16, mounting portion 32, and support ribs 42, provides the necessary structural support to the running board 10 for mounting to the side body panel 12 of the vehicle 14 without the need for separate mounting brackets, as well as the necessary structural support and rigidity for user weight and support without the need for separate or additional ribbing. Additionally, the sandwich construction and integral molding of the step portion 16, mounting portion 32, and support ribs 42 between the top deck plate 18 and bottom cover plate 20 provide flexibility in design contours, dimensions and styling. And finally, the bottom cover plate 20 provides for improved aerodynamics and strength by covering the open step portion 16 and support ribs 42 forming a thin yet strong sandwich type construction.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A composite running board for an automotive vehicle comprising:

a step portion defined by a top deck plate and a bottom cover plate spaced vertically below and generally parallel to the top deck plate, the top deck plate and the bottom cover plate extending horizontally and longitudinally between opposite first and second ends and laterally between an inboard side and outboard side;

a mounting portion formed integrally with the step portion and extending inwardly from the inboard side of the step portion, the mounting portion including a generally vertical face mounting wall projecting vertically above said top deck plate and a generally horizontal top mounting wall extending inwardly from said vertical face mounting wall and adapted for mounting the running board to the vehicle; and a plurality of support ribs spaced apart between the first and second ends of the step portion and having a first portion extending vertically between the top deck plate and the bottom cover plate and laterally from the outboard side toward the inboard side of the step portion for providing structural rigidity to the step portion, and having a second portion extending inwardly between the first portion and the top mounting wall for providing structural rigidity to the mounting portion.

2. A composite running board as set forth in claim 1 further including the plurality of support ribs having the first portion molded integrally between the top deck plate and the bottom cover plate and the second portion molded integrally between the first portion and the top mounting wall.

3. A composite running board as set forth in claim 2 further including a distal end cap extending vertically between the top deck plate and bottom cover plate and longitudinally along the outboard side of said composite running board so as to connect outboard lateral edges of said top deck plate and said bottom cover plate.

4. A composite running board as set forth in claim 3 wherein said vertical face mounting wall and said horizontal top mounting wall form a general L-shape adapted to matingly engage with a side body panel of the vehicle.

5. A composite running board as set forth in claim 4 wherein said vertical face mounting wall includes a plurality of spaced apart apertures extending therethrough for receiving a fastener to fixedly mount said composite running board to the side body panel of the vehicle.

6. A composite running board as set forth in claim 5 wherein said horizontal top mount wall includes a plurality of spaced apart apertures extending therethrough for receiving a fastener to fixedly mount said composite running board to the side body panel of the vehicle.

7. A composite running board as set forth in claim 6 wherein said step portion includes a first section and a second section along its longitudinal length, wherein said first section extends laterally outboard a first distance and said second section extends laterally outboard a second distance greater than said first distance.

8. A composite running board as set forth in claim 6 wherein said step portion includes a first section and a second section along its longitudinal length, wherein said first section is offset vertically from said second section.

9. A composite running board as set forth in claim 6 further including a stepping mat secured to at least a portion of said top deck plate.

10. A composite running board as set forth in claim 6 wherein said composite running board is comprised of integrally molded plastic.

* * * * *